United States Patent
Jeyasingham et al.

(10) Patent No.: US 12,497,111 B2
(45) Date of Patent: Dec. 16, 2025

(54) ACTIVE AERODYNAMIC VEHICLE UNDERBODY SPARE TIRE ASSEMBLY

(71) Applicant: FCA US LLC, Auburn Hills, MI (US)

(72) Inventors: Samarasingham Jeyasingham, Sterling Heights, MI (US); Jonathan M Francis, Royal Oak, MI (US); Arturo Guzman-Magana, LaSalle (CA)

(73) Assignee: FCA US LLC, Auburn Hills, MI (US)

( * ) Notice: Subject to any disclaimer, the term of this patent is extended or adjusted under 35 U.S.C. 154(b) by 159 days.

(21) Appl. No.: 18/482,188

(22) Filed: Oct. 6, 2023

(65) Prior Publication Data

US 2025/0115312 A1     Apr. 10, 2025

(51) Int. Cl.
*B62D 43/04*     (2006.01)
*B62D 35/02*     (2006.01)
*B62D 43/00*     (2006.01)

(52) U.S. Cl.
CPC .......... *B62D 43/04* (2013.01); *B62D 35/02* (2013.01); *B62D 43/00* (2013.01); *B62D 43/045* (2013.01)

(58) Field of Classification Search
CPC ........ B62D 43/04; B62D 35/02; B62D 43/00; B62D 43/045; B62D 37/02
USPC ................. 296/37.3, 180.5; 224/42.21, 42.23
See application file for complete search history.

(56) References Cited

U.S. PATENT DOCUMENTS

| | | | | |
|---|---|---|---|---|
| 4,489,806 A | * | 12/1984 | Shimomura | B62D 35/005 296/180.5 |
| 8,919,621 B2 | * | 12/2014 | O'Brien | B62D 43/005 224/42.21 |
| 9,981,702 B2 | * | 5/2018 | Franceschini | B62D 29/041 |
| 10,086,887 B1 | * | 10/2018 | Grattan | B62D 43/045 |
| 10,220,893 B2 | * | 3/2019 | Jalpa Taylor | B62D 43/04 |
| 10,246,145 B1 | * | 4/2019 | Oetting | B62D 43/002 |
| 10,308,294 B2 | * | 6/2019 | Yoon | B62D 37/02 |
| 10,457,218 B2 | * | 10/2019 | Castro Mercado | B60R 5/047 |
| 2010/0314422 A1 | * | 12/2010 | Yamada | B62D 43/04 224/42.2 |
| 2013/0153612 A1 | * | 6/2013 | O'Brien | B62D 43/045 224/42.2 |
| 2014/0097638 A1 | * | 4/2014 | Froling | B62D 35/02 296/180.1 |
| 2015/0076860 A1 | * | 3/2015 | Rettig | B62D 35/02 91/55 |
| 2015/0197291 A1 | * | 7/2015 | Roush | B62D 35/001 296/180.4 |
| 2015/0353148 A1 | * | 12/2015 | Wolf | B62D 35/007 296/180.5 |

(Continued)

*Primary Examiner* — Khaled Annis
(74) *Attorney, Agent, or Firm* — Jeremy J. Klobucar

(57) ABSTRACT

An active aerodynamic vehicle underbody spare tire assembly improves airflow dynamics and reduces drag at an underbody and rearend of a vehicle, ultimately extending vehicle battery range in an electric vehicle and providing better fuel economy in a gas-powered vehicle. The active aerodynamic vehicle underbody spare tire assembly moves the spare tire between a stowed position and a deployed position based on vehicle speed. At lower vehicle speeds, the spare tire is kept at the stowed position. And at higher vehicle speeds, the spare tire is moved to the deployed position. In varying implementations, the active aerodynamic vehicle underbody spare tire assembly can include a spare tire carrier, an actuator, and a spare tire cover.

20 Claims, 3 Drawing Sheets

(56) References Cited

U.S. PATENT DOCUMENTS

| | | | |
|---|---|---|---|
| 2015/0353149 A1* | 12/2015 | Wolf | B62D 35/007 |
| | | | 296/180.5 |
| 2016/0280032 A1* | 9/2016 | Hasegawa | B62D 37/02 |
| 2017/0113741 A1* | 4/2017 | Wolf | F15D 1/007 |
| 2017/0297637 A1* | 10/2017 | Shinedling | B62D 37/02 |
| 2023/0044790 A1* | 2/2023 | Martino | B62D 35/02 |
| 2023/0069094 A1* | 3/2023 | Moradnia | B62D 35/007 |
| 2023/0373573 A1* | 11/2023 | McAllister | B62D 37/02 |
| 2024/0051625 A1* | 2/2024 | Nakayama | B62D 35/02 |
| 2024/0343323 A1* | 10/2024 | Yokoyama | B62D 35/02 |
| 2025/0115312 A1* | 4/2025 | Jeyasingham | B62D 43/04 |

* cited by examiner

ACTIVE AERODYNAMIC VEHICLE UNDERBODY SPARE TIRE ASSEMBLY

FIELD

The present disclosure relates generally to active aerodynamic vehicle assemblies and to vehicle spare tire assemblies.

BACKGROUND

Vehicle aerodynamics in automobiles impacts vehicle battery range in electric vehicles and impacts fuel economy in gas-powered vehicles. Active aerodynamic vehicle parts are features that alter their positions based on driving parameters for aerodynamic purposes.

In certain trucks, sport utility vehicles (SUVs), and vans, as well as perhaps other types of vehicles, a spare tire can be mounted high against an underside and at a rearend of the vehicle where it typically remains until tire replacement is needed. Conventionally, such spare tires did not contribute to vehicle aerodynamic performance in intentional and meaningful ways.

SUMMARY

In at least some implementations, an active aerodynamic vehicle underbody spare tire assembly may include a carrier and an actuator. The carrier supports a spare tire at a vehicle underbody. The actuator has an interconnection with the carrier. The spare tire can be moved between at least a stowed position and a deployed position by way of actuation of the actuator. In the deployed position, a portion or more of the spare tire has a lowered location with respect to its location in the stowed position. Actuation of the actuator and movement of the spare tire between the stowed position and the deployed position is based at least upon vehicle speed. At a first vehicle speed, the spare tire is located at the stowed position. At a second vehicle speed, the spare tire is moved to the deployed position. The first vehicle speed is less than the second vehicle speed.

In at least some implementations, an active aerodynamic vehicle underbody spare tire assembly may include an actuator and a cover. The actuator moves a spare tire with respect to a vehicle underbody. The cover is situated over an outer side of the spare tire. The spare tire can be moved between at least a stowed position and a deployed position by way of actuation of the actuator. In the deployed position, a forward portion or more of the spare tire has a lowered location with respect to its location in the stowed position. Actuation of the actuator and movement of the spare tire between the stowed position and the deployed position is based at least upon vehicle speed. At a first vehicle speed, the spare tire is located at the stowed position. At a second vehicle speed, the spare tire is moved to the deployed position. The first vehicle speed is less than the second vehicle speed.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Referring in more detail to the drawings, embodiments of an active aerodynamic vehicle underbody spare tire assembly 10 (hereafter, spare tire assembly) furnishes management of aerodynamic performance at a vehicle underbody 12 and at a vehicle rearend 14 based on vehicle speed. At lower vehicle speeds, the spare tire assembly 10 locates a spare tire 16 at a stowed position, and at higher vehicle speeds, the spare tire assembly 10 locates the spare tire 16 at one or more deployed positions. It has been observed that the location of the spare tire 16 relative to the vehicle underbody 12 effects aerodynamic performance of the associated vehicle. When deployed, the spare tire assembly 10 serves to improve vehicle aerodynamic performance. In particular, aerodynamic drag at the vehicle rearend 14 that might otherwise develop has been shown to be minimized with use of the spare tire assembly 10, and aerodynamic wake closure has been shown to be facilitated via the spare tire assembly 10. Ultimately, vehicle battery range in an electric vehicle can be extended, and better fuel economy in a gas-powered vehicle can be achieved.

Moreover, unlike past spare tires that remain stationary and in place at an underside at all vehicle speeds and typically until tire replacement is needed, the spare tire assembly 10 is moved to the deployed position(s) to serve as a diffuser of sorts at the vehicle underbody 12 and at the vehicle rearend 14. In effect, the spare tire assembly 10 incorporates the functionality of a diffuser with stowage of the spare tire 16. Where discrete underside diffusers were installed in the past, packaging demands often precluded mounting of underside spare tires altogether or otherwise required spare tire locations at the underside that have proved inconvenient or largely inaccessible.

Figure 5:
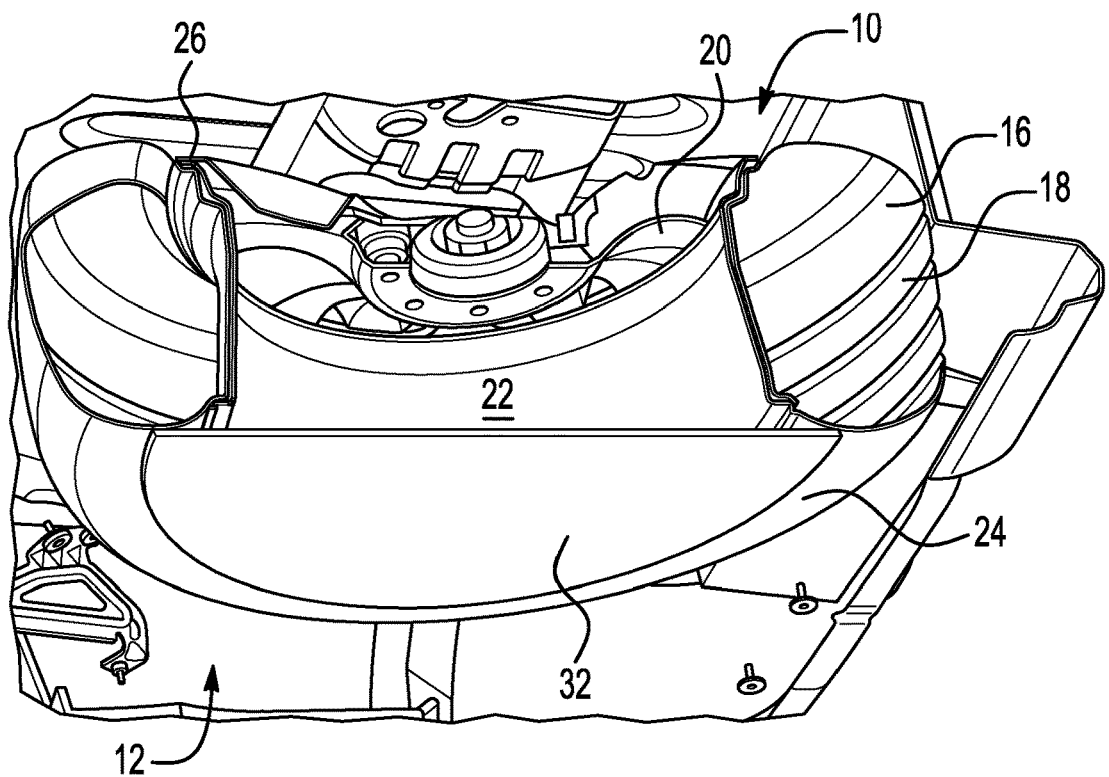
FIG. 5 is a sectional view of an embodiment of a cover of the active aerodynamic vehicle underbody spare tire assembly.

Referring to FIG. 5, in this example the spare tire 16 has a rubber tire 18 secured around a metal wheel 20. An interior 22 of the spare tire 16 spans between a first outer side 24 and an opposite second outer side 26. When the spare tire 16 is installed as a replacement in a vehicle, the first outer side 24 faces inward of the vehicle and is hence substantially hidden from view, and conversely the second outer side 26 faces outward of the vehicle and is visible.

The spare tire assembly 10 can have various designs, constructions, and components in varying embodiments depending on the particular application and installation, underbody packaging demands, and/or desired aerodynamic performance, among other potential factors. In the embodiment of the figures, and with reference now to FIG. 1, the spare tire assembly 10 supports the spare tire 16 at the vehicle underbody 12 and near the vehicle rear end 14. This location is not uncommon in trucks, sport utility vehicles (SUVs), vans, and other types of vehicles. Here, the spare tire 16 is readily accessible for a tire replacement event. According to this embodiment, the spare tire assembly 10 may include a carrier 28, an actuator 30, a cover 32, and a controller 34; still, in varying embodiments, the spare tire assembly 10 could include more, less, and/or different components.

The carrier 28 serves to support and hold the spare tire 16 at the vehicle underbody 12 when the spare tire assembly 10 exhibits the stowed position and the deployed position(s), and when the spare tire assembly 10 incites movement therebetween. The carrier 28 can have various designs, constructions and components in varying embodiments. Depending on its form, the carrier 28 can have one or more components with an attachment to one or more components of the vehicle underbody 12. In some non-limiting examples, the carrier 28 can be made-up of one or more brackets, one or more bars, one or more straps, nuts and bolts, and/or similar components. An interconnection 36 can extend between the carrier 28 and the actuator 30 to transfer movement therebetween when bringing the spare tire assembly 10 to the stowed position and to the deployed position(s). The interconnection 36 can be in the form of a bracket connection, nut-and-bolt connection, linkage connection, latch connection, or the like. The carrier 28 can move concurrently with the spare tire 16 upon its movement between the stowed position and deployed position(s).

The actuator 30 is actuated to impart downward and upward movement to the spare tire 16 with respect to the vehicle underbody 12, and in order to bring the spare tire assembly 10 to the stowed position and the deployed position(s). Deactuation of the actuator 30 ceases such movement. The actuator 30 can have various designs, constructions, and components in varying embodiments. Depending on its type, the actuator 30 can have one or more components with an attachment to one or more components of the vehicle underbody 12. For transferring movement, the actuator 30 can be connected to the carrier 28 via the interconnection 36, or can be more directly connected to the spare tire 16 itself in which case the carrier 28 and interconnection 36 can be constituent parts and components of the actuator 30. The actuator 30 electrically communicates with the controller 34 and receives activation and deactivation commands therefrom. In some non-limiting examples, the actuator 30 can be a linear actuator, a rotary actuator, a winch actuator, or some other type of actuator.

Figure 6:
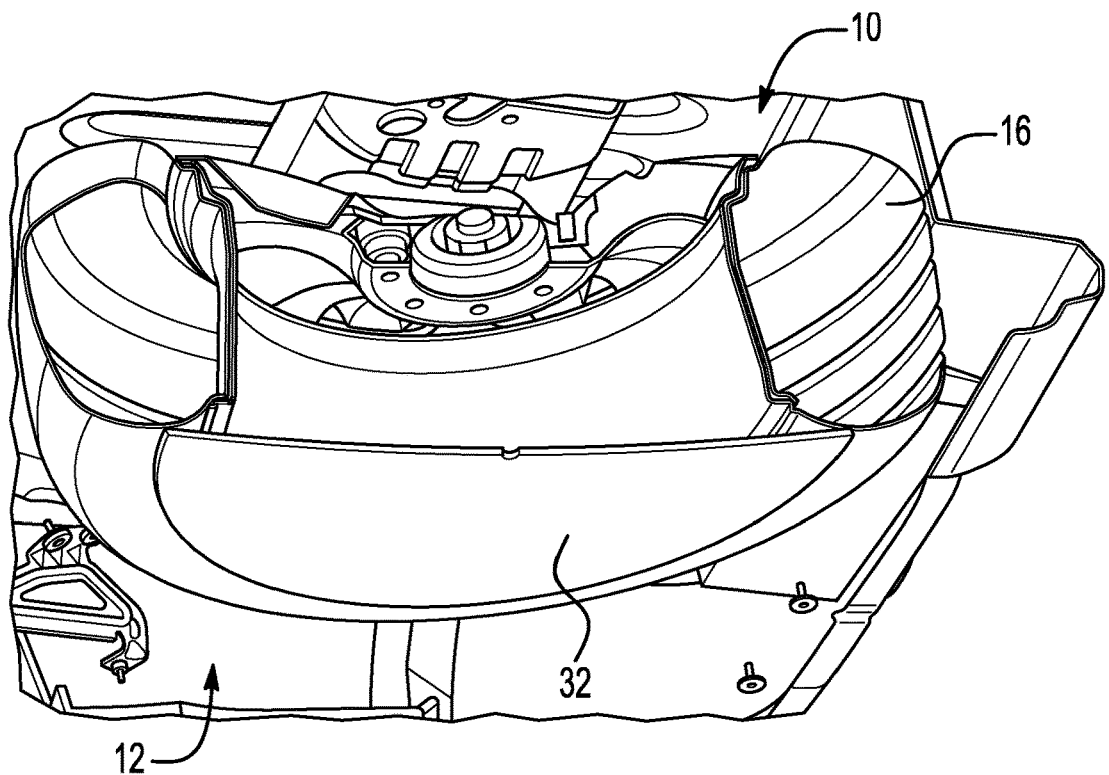
FIG. 6 is a sectional view of another embodiment of a cover of the active aerodynamic vehicle underbody spare tire assembly.

The cover 32 is situated over the first outer side 24 of the spare tire 16 and serves to enhance aerodynamics thereover and block airflow from the spare tire's interior 22. The cover 32 can also serve to protect the spare tire 16 from road debris that might otherwise strike the spare tire 16 at increased vehicle speeds. The cover 32 can have various designs constructions, and components in varying embodiments. With reference now to FIGS. 5 and 6, the cover 32 can be secured in place at the first outer side 24 via nut and bolt securement, snap-in securement, press-fit securement, or some other way. Due to its securement, the cover 32 moves concurrently with the spare tire 16 upon movement between the stowed position and deployed position(s). The cover 32 can be composed of a hard material such as a steel or a plastic material, and can have a substantially solid construction that lacks larger-sized openings, as shown in FIGS. 5 and 6. In the embodiment of FIG. 5, the cover 32 has a generally planar and flat profile, and in the embodiment of FIG. 6 the cover 32 has a generally convex profile. Such profiles have been shown to enhance aerodynamic performance, but other profiles may be suitable.

The controller 34 manages the functionality of the spare tire assembly 10 and regulates actuation and deactuation of the actuator 30 based in part or more upon vehicle speed that is received by the controller 34 as an input. The controller 34 controls the lowering and raising of the spare tire assembly 10 via the actuator 30, as described in greater detail below. Electrical communication is furnished between the controller 34 and the actuator 30 for these purposes. In the vehicle's larger electronic system, the controller 34 can be a discrete electronic control unit or module dedicated to control of the spare tire assembly 10, or control of the spare tire assembly 10 can be incorporated into an electronic control unit or module that controls other electrical systems and/or subsystems, in which case the controller 34 manages a variety of vehicle functions. Depending on the embodiment, the controller 34 can have a microcontroller, a memory component (e.g., SRAM, EEPROM, flash), inputs (e.g., vehicle speed), outputs (e.g., actuator drivers), communication links, and/or embedded software. Control logic at the controller 34 carries out the functionality of the spare tire assembly 10.

Figure 1:
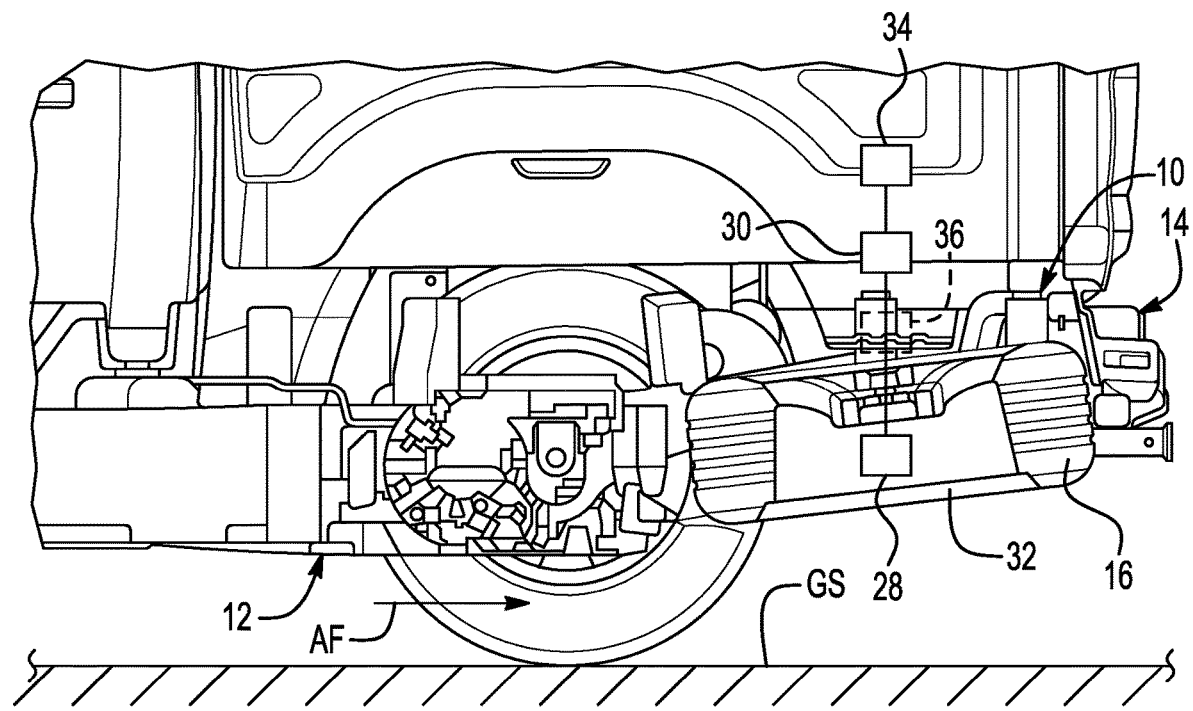
FIG. 1 depicts the active aerodynamic vehicle underbody spare tire assembly in a stowed position.
Figure 2:
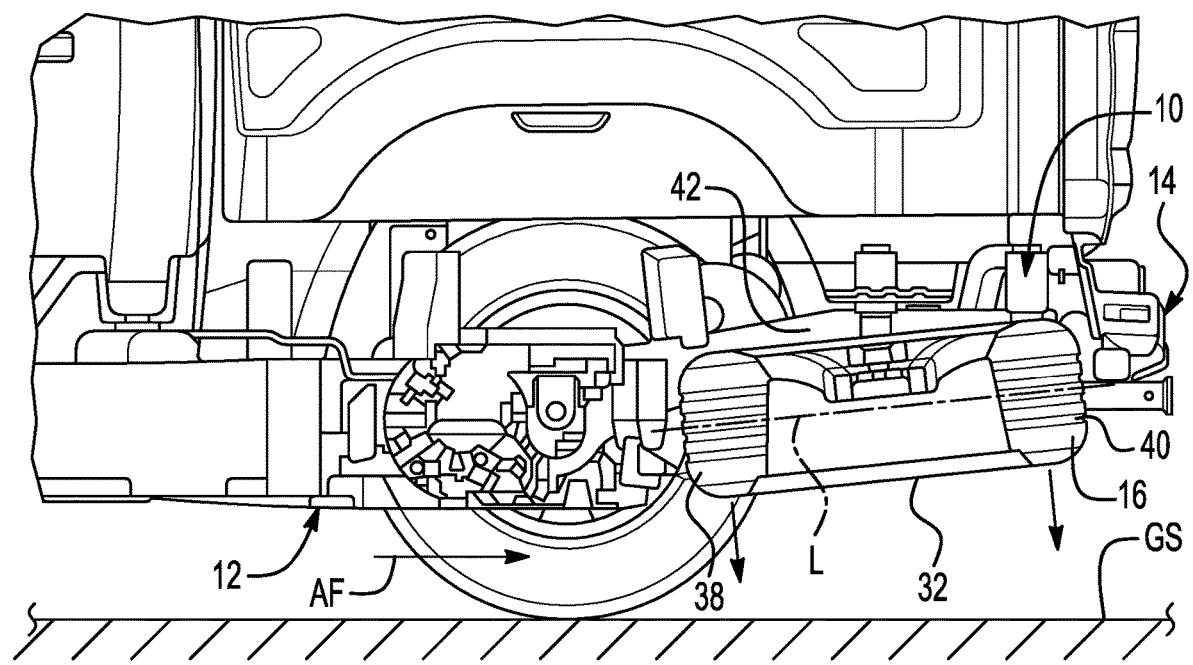
FIG. 2 depicts the active aerodynamic vehicle underbody spare tire assembly in a first deployed position.
Figure 3:
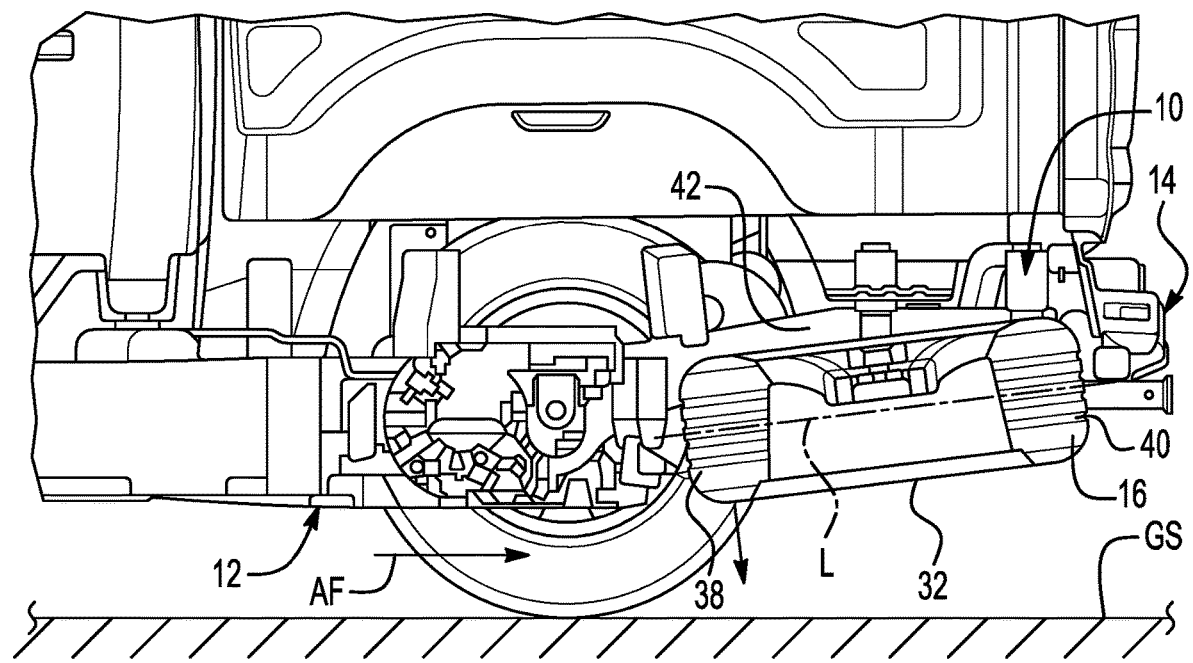
FIG. 3 depicts the active aerodynamic vehicle underbody spare tire assembly in a second deployed position.
Figure 4:
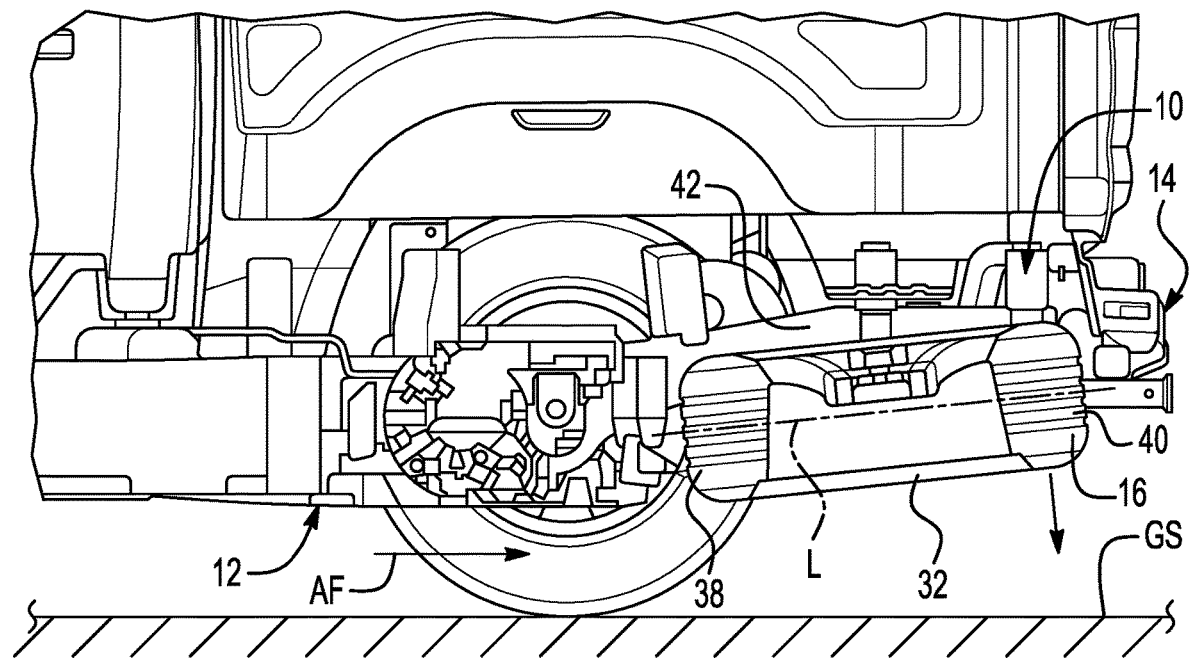
FIG. 4 depicts the active aerodynamic vehicle underbody spare tire assembly in a third deployed position.

In use, the spare tire assembly 10 can be moved between the stowed position and the deployed position(s) on the basis of vehicle speed. At lower vehicle speeds, in general, the spare tire assembly 10 can be brought to, and kept at, the stowed position for ground clearance purposes and to avoid impact with inclined driveways or ramps or other raised or inclined roadway objects. With reference to FIG. 1 which depicts the stowed position, the spare tire 16 has a higher location with respect to a ground surface GS and relative to the vehicle underbody 12 when the spare tire assembly 10 is in the stowed position and compared to its location in the deployed position(s) (FIGS. 2-4). The spare tire 16 can be held closely against the vehicle underbody 12 without substantial clearances and spacings therebetween in the stowed position, as illustrated in FIG. 1. The spare tire 16 is raised and moved upward via the actuator 30 to bring it to the stowed position from the deployed position(s). Effect on vehicle aerodynamic performance by the spare tire 16 can be somewhat negligible when the spare tire assembly 10 is in the stowed position.

At higher vehicle speeds, in contrast, the spare tire assembly 10 can be brought to, and kept at, the deployed position(s). Improvements in vehicle aerodynamic performance have been shown when the spare tire assembly 10 is in the deployed position(s). Computational fluid dynamics (CFD) simulations and velocity plot animations have evidenced aerodynamic drag reduction at the vehicle rearend 14 and aerodynamic wake closure to a greater degree at the vehicle rearend 14. The spare tire assembly 10 can have a single deployed position carried out at a single vehicle speed, or can have multiple discrete deployed positions carried out at discrete vehicle speeds, depending on the embodiment. With reference now to FIGS. 2-4 which depict multiple deployed positions, the spare tire 16 has a lowered location with respect to the ground surface GS and relative to the vehicle underbody 12 when the spare tire assembly 10 is in the deployed position and compared to its location in the stowed position. A clearance 42 can be established and can reside between the spare tire 16 and the vehicle underbody 12—and particularly between the second outer side 26 and opposing vehicle underbody surface(s)—when in the deployed position. The spare tire 16 is lowered and moved downward via the actuator 30 to bring it to the deployed position from the stowed position.

With reference now to FIGS. 1-4, in this embodiment the spare tire assembly 10 provides a single stowed position and multiple deployed positions. In the stowed position of FIG. 1, the vehicle can be traveling at a first vehicle speed which may be a lower vehicle speed. The lower vehicle speed may be a non-highway vehicle speed. The spare tire assembly 10 can be kept in the stowed position while the vehicle travels at the first vehicle speed. The first vehicle speed may be all current vehicle speeds below a predetermined vehicle speed, according to an embodiment. The predetermined vehicle speed can be a vehicle speed at which, once attained and/or exceeded, the spare tire assembly 10 initiates movement to a first of the deployed positions. When the first vehicle speed is less than (<) the predetermined vehicle speed, the spare tire assembly 10 can be maintained in the stowed position; conversely, when the current vehicle speed is greater than (>) the predetermined vehicle speed, the spare tire assembly 10 can be brought to the first of the deployed positions. This comparison and determination can be executed via the controller 34 which can receive current vehicle speed as an input and can be programmed to make the comparison and output actuator commands accordingly. The predetermined vehicle speed may differ in varying embodiments, and may be a single value or may be a range of values. In non-limiting examples, the predetermined vehicle speed can have a value of 35 miles-per-hour (MPH), or can range between 30 MPH and 40 MPH, depending on the embodiment; still, the predetermined vehicle speed can have other values and other ranges in other embodiments.

In a first deployed position of FIG. 2, the vehicle can be traveling at a second vehicle speed which may be a higher vehicle speed. The higher vehicle speed may be a highway vehicle speed. The second vehicle speed, per this embodiment, is greater than the first vehicle speed and greater than the predetermined vehicle speed. The second vehicle speed can be a range of current vehicle speeds that are above the predetermined vehicle speed and yet below a third vehicle speed at which a second deployed position is initiated (described below). Relative to the stowed position, in the first deployed position the spare tire 16 is brought to a lowered location. The actuator 30 is actuated to impart downward movement to the spare tire 16, and both a forward portion 38 and a rearward portion 40 of the spare tire 16 are moved downward, per this embodiment. This is represented by the two arrowed lines lacking reference numerals in FIG. 2. Still, in another embodiment only the forward portion 38 could be moved downward in the first deployed position. The forward portion 38 lies in more direct confrontation with an airflow AF at the vehicle underbody 12 compared to the rearward portion 40.

Further, a longitudinal axis L of the spare tire 16 establishes a first non-zero acute angle with respect to the ground surface GS when the spare tire assembly 10 is in the first deployed position, as shown in FIG. 2—this condition is also true of the stowed position, as evidenced from FIG. 1. The longitudinal axis L is an imaginary axis that spans radially through the spare tire 16 (radially is used here with respect to the circular shape of the spare tire). The forward portion 38 is positioned closer to the ground surface GS than the rearward portion 40, as shown. In non-limiting examples, in the first deployed position both the forward and rearward portions 38, 40 of the spare tire 16 can be lowered by approximately 16 millimeters (mm) from the stowed position, can be lowered by approximately 25 mm from the stowed position, can be lowered by approximately 41 mm from the stowed position, or can be lowered by another amount. Furthermore, when the vehicle slows down and travels again at the first vehicle speed, the spare tire assembly 10 can be brought back to the stowed position from the first deployed position.

In a second deployed position of FIG. 3, the vehicle can be traveling at a third vehicle speed which may be a higher vehicle speed. The higher vehicle speed may be a highway vehicle speed. The third vehicle speed, per this embodiment, is greater than the second vehicle speed. The third vehicle speed can be a range of current vehicle speeds that are above the second vehicle speed and yet below a fourth vehicle speed at which a third deployed position is initiated (described below). Relative to the first deployed position, in the second deployed position only the forward portion 38 of the spare tire 16 is brought to a lowered location. The actuator 30 is actuated to impart downward movement to only the forward portion 38 of the spare tire 16, per this embodiment. This is represented by the arrowed line lacking a reference numeral adjacent the forward portion 38 in FIG. 3. Still, in another embodiment both of the forward and rearward portions 38, 40 could be moved downward in the second deployed position. Further, the longitudinal axis L of the spare tire 16 establishes a second non-zero acute angle with respect to the ground surface GS when the spare tire assembly 10 is in the second deployed position. Since only the forward portion 38 is moved downward according to this embodiment, the second non-zero acute angle has a value that is greater than that of the first non-zero acute angle of the first deployed position. In a non-limiting example, in the second deployed position the forward portion 38 of the spare tire 16 can be lowered by approximately 15 mm from the first deployed position, or can be lowered by another amount. Furthermore, when the vehicle slows down and travels again at the second or first vehicle speed, the spare tire assembly 10 can be brought back to the first deployed position or back to the stowed position from the second deployed position.

Lastly, according to this embodiment, in a third deployed position of FIG. 4, the vehicle can be traveling at a fourth vehicle speed which may be a higher vehicle speed. The higher vehicle speed may be a highway vehicle speed. The fourth vehicle speed, per this embodiment, is greater than the third vehicle speed. The fourth vehicle speed can be a range of current vehicle speeds that are above the third vehicle speed. Relative to the second deployed position, in the third deployed position only the rearward portion 40 of the spare tire 16 is brought to a lowered location. The actuator 30 is actuated to impart downward movement to only the rearward portion 40 of the spare tire 16, per this embodiment. This is represented by the arrowed line lacking a reference numeral adjacent the rearward portion 40 in FIG. 4. Still, in another embodiment both of the forward and rearward portions 38, 40 could be moved downward in the third deployed position, or only the forward portion 38 could be moved downward. Further, the longitudinal axis L of the spare tire 16 establishes a third non-zero acute angle with respect to the ground surface GS when the spare tire assembly 10 is in the third deployed position. Since only the rearward portion 40 is moved downward according to this embodiment, the third non-zero acute angle has a value that is less than that of the second non-zero acute angle of the second deployed position. In a non-limiting example, in the third deployed position the rearward portion 40 of the spare tire 16 can be lowered by approximately 15 mm from the second deployed position, or can be lowered by another amount. Furthermore, when the vehicle slows down and travels again at the third or second or first vehicle speed, the spare tire assembly 10 can be brought back to the second deployed position, back to the first deployed position, or back to the stowed position from the third deployed position.

As used herein, the terms "general," "generally," "approximately," and "substantially" are intended to account for the inherent degree of variance and imprecision that is often attributed to, and often accompanies, any design and manufacturing process, including engineering tolerances— and without deviation from the relevant functionality and outcome—such that mathematical precision and exactitude is not implied and, in some instances, is not possible. In other instances, the terms "general," "generally," "approximately," and "substantially" are intended to represent the inherent degree of uncertainty that is often attributed to any quantitative comparison, value, and measurement calculation, or other representation.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. An active aerodynamic vehicle underbody spare tire assembly, comprising:
    a snare tire having a rubber tire on a wheel, the snare tire has an interior defined within the wheel and between a first outer side and a second outer side of the snare tire;
    a carrier connected to the wheel for supporting the spare tire at a vehicle underbody, and at least part of the carrier is received in the interior; and
    an actuator having an interconnection with said carrier, wherein the spare tire is moveable via actuation of said actuator between at least a stowed position and a deployed position, in said deployed position at least a portion of the spare tire has a lowered location with respect to a location of said portion of the snare tire when the snare tire is in said stowed position, and wherein actuation of said actuator and movement of the spare tire between said stowed position and said deployed position is based at least upon vehicle speed, at a first vehicle speed the spare tire is located at said stowed position and at a second vehicle speed the spare tire is moved to said deployed position, the first vehicle speed being less than the second vehicle speed.

2. The active aerodynamic vehicle underbody spare tire assembly as set forth in claim 1, further comprising a cover situated over the first outer side of the spare tire overlapping the interior, and wherein the second outer side of the snare tire is located adjacent to the vehicle underbody.

3. The active aerodynamic vehicle underbody spare tire assembly as set forth in claim 1, further comprising a controller regulating actuation and deactuation of said actuator based at least upon vehicle speed received as an input to said controller.

4. The active aerodynamic vehicle underbody spare tire assembly as set forth in claim 1, wherein actuation of said actuator and movement of the spare tire between said stowed position and said deployed position involves a predetermined vehicle speed, when a vehicle speed is less than said predetermined vehicle speed the spare tire is moved to said stowed position, and when the vehicle speed is greater than said predetermined vehicle speed the spare tire is moved to said deployed position.

5. The active aerodynamic vehicle underbody spare tire assembly as set forth in claim 1, wherein in said deployed position a longitudinal axis of the spare tire has a non-zero acute angle with respect to a ground surface beneath the spare tire.

6. The active aerodynamic vehicle underbody spare tire assembly as set forth in claim 1, wherein in said deployed position both a forward portion and a rearward portion of the spare tire have a lowered location with respect to their locations in said stowed position.

7. The active aerodynamic vehicle underbody spare tire assembly as set forth in claim 1, wherein in said deployed position only a forward portion of the spare tire has a lowered location with respect to its location in said stowed position, wherein the forward portion lies in more direct confrontation with an airflow during movement of the vehicle than does an opposite rearward portion of the snare tire.

8. The active aerodynamic vehicle underbody spare tire assembly as set forth in claim 1, wherein said deployed position includes a first deployed position and a second deployed position, at least a portion of the spare tire has a lowered location in said second deployed position with respect to its location in said first deployed position, at the second vehicle speed the spare tire is moved to said first deployed position and at a third vehicle speed the spare tire is moved to said second deployed position, the second vehicle speed being less than the third vehicle speed.

9. The active aerodynamic vehicle underbody spare tire assembly as set forth in claim 1, wherein said deployed position includes a first deployed position and a second deployed position, a longitudinal axis of the spare tire has a first acute angle with respect to a ground surface beneath the spare tire in said first deployed position and the longitudinal axis has a second acute angle with respect to the ground surface in said second deployed position, the first acute angle being less than the second acute angle, at the second vehicle speed the spare tire is moved to said first deployed position and at a third vehicle speed the spare tire is moved to said second deployed position, the second vehicle speed being less than the third vehicle speed.

10. The active aerodynamic vehicle underbody spare tire assembly as set forth in claim 1, wherein said deployed position includes a plurality of deployed positions, in at least one of said plurality of deployed positions both a forward portion and a rearward portion of the spare tire has a lowered location with respect to their locations in said stowed position, and in at least another one of said plurality of deployed positions only the forward portion of the spare tire has a lowered location with respect to its location in said stowed position, and wherein actuation of said actuator and movement of the spare tire among said plurality of deployed positions is based at least upon vehicle speed.

11. A vehicle having and active aerodynamic vehicle underbody spare tire assembly, comprising:
a vehicle having a rearend and a vehicle underbody;
a snare tire located adjacent to the vehicle underbody, the snare time including a rubber tire mounted on a wheel, with an interior defined between a first outer side of the snare tire and a second outer side of the snare tire, the second outer side is located closer to the vehicle underbody than is the first outer side, and the snare tire has forward portion that is located farther from the rearend than is a rearward portion of the snare tire;
an actuator connected to the vehicle and to the snare tire, the actuator being electrically actuated to move the spare tire with respect to the vehicle underbody; and
a cover situated over the first outer side of the spare tire and at least part of the interior,
wherein the actuator is actuated to move the snare time between at least a stowed position and a deployed position, in said deployed position at least the forward portion of the spare tire has a lowered location with respect to the location of the forward portion in said stowed position, and wherein actuation of said actuator and movement of the spare tire between said stowed position and said deployed position is based at least upon vehicle speed, at a first vehicle speed the spare tire is located at said stowed position and at a second vehicle speed the spare tire is moved to said deployed position, the first vehicle speed being less than the second vehicle speed.

12. The vehicle having the active aerodynamic vehicle underbody spare tire assembly as set forth in claim 11, further comprising a carrier connected to the wheel and supporting the spare tire at the vehicle underbody and having a connection with said actuator.

13. The vehicle having the active aerodynamic vehicle underbody spare tire assembly as set forth in claim 12, further comprising a controller regulating actuation and deactuation of said actuator based at least upon vehicle speed received as an input to said controller.

14. The vehicle having the active aerodynamic vehicle underbody spare tire assembly as set forth in claim 11, wherein in said deployed position a longitudinal axis of the spare tire has a non-zero acute angle with respect to a ground surface beneath the spare tire.

15. The vehicle having the active aerodynamic vehicle underbody spare tire assembly as set forth in claim 11, wherein actuation of said actuator and movement of the spare tire between said stowed position and said deployed position involves a predetermined vehicle speed, when a vehicle speed is less than said predetermined vehicle speed the spare tire is moved to said stowed position, and when the vehicle speed is greater than said predetermined vehicle speed the spare tire is moved to said deployed position.

16. The vehicle having the active aerodynamic vehicle underbody spare tire assembly as set forth in claim 11, wherein in said deployed position only the forward portion of the spare tire has a lowered location with respect to its location in said stowed position.

17. The vehicle having the active aerodynamic vehicle underbody spare tire assembly as set forth in claim 11, wherein said deployed position includes a first deployed position and a second deployed position, at least a forward-most portion of the spare tire has a lowered location in said second deployed position with respect to its location in said first deployed position, at the second vehicle speed the spare tire is moved to said first deployed position and at a third vehicle speed the spare tire is moved to said second deployed position, the second vehicle speed being less than the third vehicle speed.

18. The vehicle having the active aerodynamic vehicle underbody spare tire assembly as set forth in claim 11, wherein said deployed position includes a first deployed position and a second deployed position, a longitudinal axis of the spare tire has a first non-zero acute angle with respect to a ground surface beneath the spare tire in said first deployed position and the longitudinal axis has a second non-zero acute angle with respect to the ground surface in said second deployed position, the first non-zero acute angle being less than the second non-zero acute angle, at the second vehicle speed the spare tire is moved to said first deployed position and at a third vehicle speed the spare tire is moved to said second deployed position, the second vehicle speed being less than the third vehicle speed.

19. The vehicle having the active aerodynamic vehicle underbody spare tire assembly as set forth in claim 11, wherein said deployed position includes a plurality of deployed positions, in at least one of said plurality of deployed positions both the forward portion and a rearward portion of the spare tire have a lowered location with respect to their locations in said stowed position, and in at least another one of said plurality of deployed positions only the forward portion of the spare tire has a lowered location with respect to its location in said stowed position, and wherein actuation of said actuator and movement of the spare tire among said plurality of deployed positions is based at least upon vehicle speed.

20. The vehicle having the active aerodynamic vehicle underbody spare tire assembly as set forth in claim 11, wherein said deployed position includes a plurality of deployed positions, in at least one of said plurality of deployed positions the forward portion of the spare tire has a first lowered location with respect to its location in said stowed position, and in at least another one of said plurality of deployed positions the forward portion of the spare tire has a second lowered location that differs from the first lowered location.

* * * * *